Nov. 29, 1966  W. W. WEBB ETAL  3,288,663
METHOD OF PREPARING A THERMOPLASTIC
MATERIAL HAVING PILE SURFACE
Filed Oct. 20, 1961  3 Sheets-Sheet 1
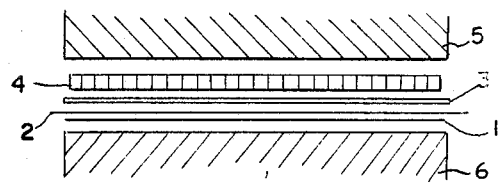
FIG. 1.
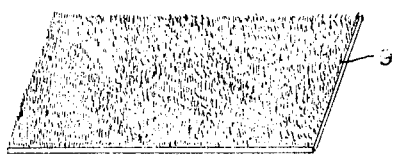
FIG. 2.
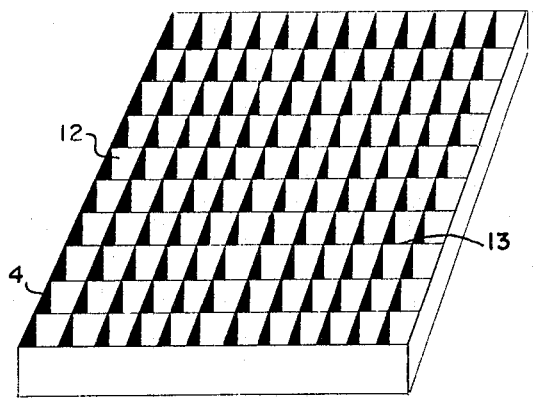
FIG. 3.
FIG. 5.
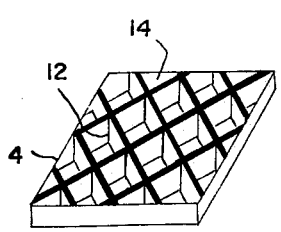
FIG. 4.
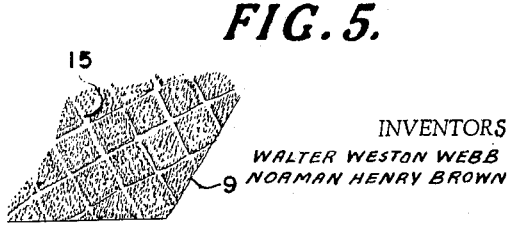
INVENTORS
WALTER WESTON WEBB
NORMAN HENRY BROWN
BY Cushman, Darby & Cushman
ATTORNEYS Nov. 29, 1966   W. W. WEBB ETAL   3,288,663
METHOD OF PREPARING A THERMOPLASTIC
MATERIAL HAVING PILE SURFACE
Filed Oct. 20, 1961   3 Sheets-Sheet 2
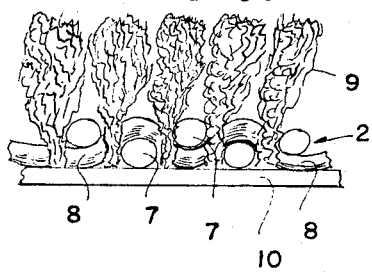
FIG.6.
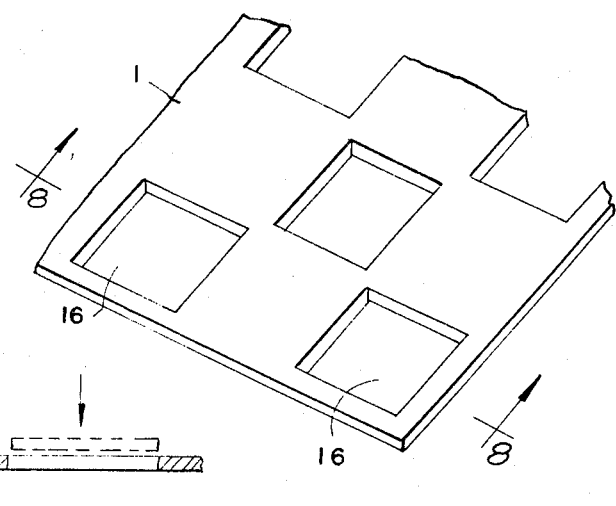
FIG.7.
FIG.8.
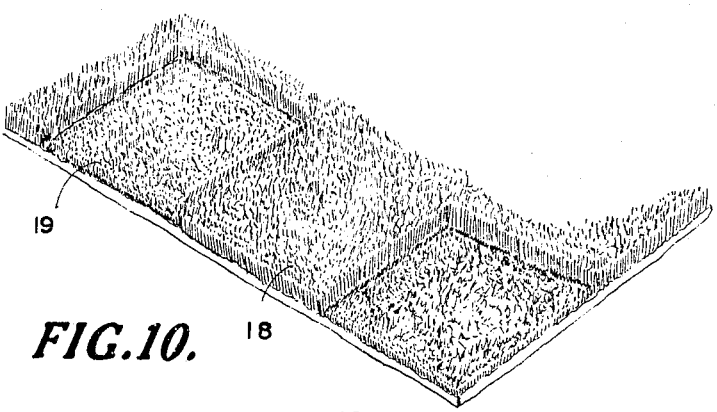
FIG.10.
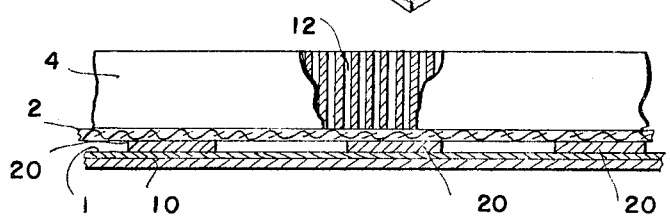
FIG.9.
INVENTORS
WALTER WESTON WEBB
NORMAN HENRY BROWN
BY
Cushman, Darby & Cushman
ATTORNEYS

United States Patent Office 3,288,663
Patented Nov. 29, 1966

3,288,663
METHOD OF PREPARING A THERMOPLASTIC MATERIAL HAVING PILE SURFACE
Walter Weston Webb and Norman Henry Brown, both of Hyde, England, assignors to Imperial Chemical Industries Limited, London, England, a corporation of Great Britain
Filed Oct. 20, 1961, Ser. No. 146,491
Claims priority, application Great Britain, Nov. 21, 1960, 39,913/60
14 Claims. (Cl. 156—222)

The present invention relates to the manufacture of carpet material or the like comprising thermoplastic sheet having a pile surface on one side.

It has been proposed (British Patents 865,749 and 869,734) to prepare pile products from thermoplastic sheet material by means of a process which involves forming a sandwich assembly comprising the thermoplastic sheet placed against a fabric, heating the thermoplastic sheet to soften the same and then forcing the softened thermoplastic through the fabric interstices to form the pile.

The product obtained by the above technique suffers from several disadvantages which seriously limit its uses. Thus, for example, the pile is obtained in the form of hard globules which give the product a poor hand and coarse appearance. Under foot, the product has very little of the yielding qualities or resilience which one would expect from a carpet material. In short, therefore, the product does not really resemble carpet material and cannot be effectively used as a substitute therefor.

The principal object of the present invention is to provide a new and advantageous improvement in the above-mentioned procedures and products. A more specific object of the invention is the provision of a novel process for preparing carpet material by forcing softened thermoplastic material through fabric or the equivalent whereby the resulting pile product has a soft and desirable hand and is otherwise very similar to wool carpeting obtained by conventional procedures. Another object of the invention is to provide a process of considerable versatility whereby pile products having a wide variety of designs may be easily and conveniently prepared. Other objects and advantages of the invention will be apparent from the following detailed description of the invention.

Broadly stated, the method of the present invention comprises placing a sheet of thermoplastic material, typically polyvinyl chloride, in contact with one side of a fabric or other equivalent restraining layer having a plurality of interstices therein, thereafter placing an open mesh-like or cellular spacing element in contact with the other side of the fabric or restraining layer, heating the resulting sandwich or assembly to render the thermoplastic material soft and then compressing the sandwich to force the thus softened thermoplastic material through the interstices in the restraining layer and form the pile surface thereon. In essence, the softened thermoplastic material is extruded through the interstices of the restraining layer into the open areas of the spacing element. After the material has cooled, the spacing element is removed to leave the pile surface adjacent the restraining element, the pile comprising a plurality of curly fibrils or filaments, some or all of which may be doubled over and/or twisted together while retaining their individuality as distinct, nonglobular fibrils to give a soft, resilient surface characteristic of conventional carpet materials.

The success of the invention in obtaining a carpet-like product of optimum characteristics is due to a number of unique procedural features. For one thing, the present process requires the use of the open spacing element on the side where the pile is to be formed. As described in greater detail hereinafter, the spacing element must be sufficiently open adjacent the fabric to permit the plastic to come through the fabric interstices without significant interference. Other characteristics of this element are set forth below and it is sufficient at this point to simply note that this element has a critical and definite effect on the nature of the pile surface which is obtained.

Other distinguishing characteristics of the present invention include using relatively high compressing pressures and fabric or like material as the restraining layer containing a very large number of interstices per unit area, the pressure and number of interstices being correlated as generally outlined hereinafter.

The invention is described in more detail below in connection with the accompanying drawings wherein:

FIGURE 1 represents a diagrammatic view of one preferred way of carrying out the present invention;

FIGURE 2 is a perspective view of the resulting product;

FIGURES 3 and 4 are perspective views of typical spacing elements suitable for use herein;

FIGURE 5 is a fragmentary perspective view showing a patterned type of pile surface resulting from the use of the spacing element of FIGURE 4;

FIGURE 6 is a vertical sectional view of a pile product obtained by the present invention;

FIGURE 7 is a fragmental perspective view of a thermoplastic sheet modified to provide for an inlay design effect in the pile surface;

FIGURE 8 is a vertical sectional view taken along the line 8—8 of FIGURE 7;

FIGURE 9 is a diagrammatic view in vertical section showing another way of carrying out the present invention;

FIGURE 10 is a fragmental perspective view of the pile product obtained by the arrangement of FIGURE 9;

Figure 11:
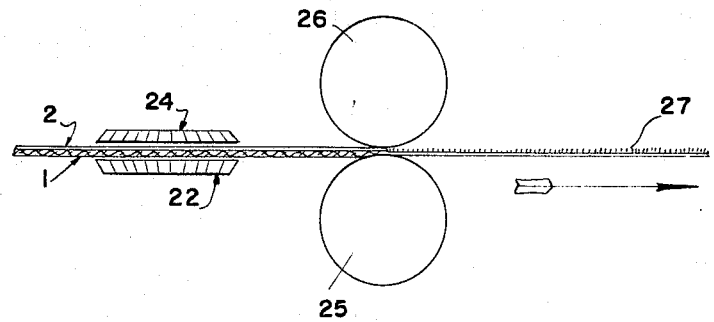
FIGURE 11 is a diagrammatic view of an arrangement for continuously carrying out the process of the present invention.

Referring more specifically to the drawings, FIGURE 1 shows a sheet of thermoplastic material 1 such as polyvinyl chloride which is covered by a fabric 2 or equivalent restraining element as hereinafter defined. This in turn is covered by a sheet of metal mesh 3 which is itself covered by a metal spacer or spacing element 4. This assembly or sandwich is placed between the press platens 5 and 6. The assembly is then heated to render the polyvinyl chloride soft and plastic whereupon pressure is exerted by closing the platents 5 and 6. The effect of this application of pressure and heat is to force the polyvinyl chloride through the interstices of the fabric 2. The fabric is held in place by the metal mesh 3 which, while performing this function, allows virtually free passage of the plastic through the fabric. The purpose of the metal spacer 4 is to allow sufficient space for the emerging columns of plastic to travel upwards for some distance to form the pile without any interference.

The product obtained by the process exemplified in FIGURE 1 is illustrated in FIGURES 2 and 6. As best shown in FIGURE 6, the thermoplastic material passes through the interstices between the warp 7 and weft 8 of the fabric 2 to form a plurality of fibrils or filaments which constitute the pile surface 9. As a rule, the length of these fibrils may be of the order of 0.25 to 0.75 inch but, in any case, the length is usually many times, e.g. 20–200 times, greater than the fibril diameter. It will, however, be appreciated that the actual dimensions of these fibrils will depend on the number and size of the interstices in the fabric and the temperature and pressure used as well as other operating conditions. Generally speaking, the fibrils are quite curly and tend to coil back on themselves and may even become twisted or matted together, thus giving a very soft hand and cushioning effect which is similar to that of carpet material made by conventional tufting procedures.

It will be recognized that various modifications may be made in the process as illustrated in FIGURE 1. Thus, for example, the metal mesh 3 may be omitted if the fabric or like restraining layer 2 itself is sufficiently strong. The purpose of the mesh 3 is to keep the restraining layer 2 in place and to prevent it from bursting into the open areas of the spacing element 4. Thus, if the restraining fabric is strong enough to withstand the pressures involved without bursting, or the open areas in the spacer are small enough so that the spacer walls retain and protect the fabric, it is possible to use only the spacer 4, same being then placed directly against the fabric.

Any polymeric material which becomes plastic on heating may be used for the purposes of the present invention. Typical examples are polyethylene, polypropylene, polyethylene terephthalate, polyamides and vinyl polymers, including homopolymers and copolymers, such as the vinyl acetate/vinyl chloride copolymers, polystyrene, polyvinyl acetate, vinyl chloride/vinylidene chloride copolymers, polyvinylidene chloride, and vinylidene chloride/acrylonitrile copolymers, with polyvinyl chloride preferred. The polymer may be compounded in conventional fashion with the usual types of plasticizers and the proportion of plasticizer to polymer in any particular case should be determined in the light of the final use of the product. Thus, a low plasticizer ratio should be used for a comparatively hard, tough product while a high ratio should be used for a soft product with an easy "handle." Again the conditions of processing will influence the type of composition chosen but it has been found that a range of polymer/plasticizer in the ratio of 100/40 to 100/90 will give good results and an excellent variety of products.

The restraining layer or element 2 may be a material in sheet form which has a plurality of interstices therein, the function of these interstices being to allow the thermoplastic material when hot and plastic to be pushed through the interstices from one side of the layer to form a pile on the other. The restraining element may be a textile or metal fabric or other sheet material having pores, perforations or openings therein, within the limits herein prescribed. For convenience, the term "interstices" is used to describe the openings in the fabric or other type of restraining sheet used herein regardless of the nature of these openings. Preferably, the restraining element is a knitted or woven fabric although a nonwoven web may be used as long as it is not a continuous sheet, i.e. provided it has interstices therein for the thermoplastic material to be forced through. The fabric may be of natural or synthetic fibers including, for example, cotton, polyethylene terephthalate, nylon or glass fibers or mixtures of these but it is important to insure that the fibrous material is chosen in relation to the temperatures and other conditions which will be used. Thus, it is necessary to choose a fabric which does not soften or melt below the temperature to be used in the process. The fabric may be composed of metal if a product with a metal base instead of a conventional textile fabric is required. The size of yarns, the weave or general structure and the properties will influence the characteristics of the pile and of the product as a whole. Thus the choice of fabric should be made with the end product in view.

It is important to the success of the invention to use a fabric or other restraining layer which provides a minimum of about 750 interstices per square inch and a maximum of about 10,000 interstices per square inch. Obviously, the pressure applied to both sides of the sandwich can be varied and will depend to at least some extent on the nature of the thermoplastic material, the temperature used, etc. However, in order to obtain the desired results, it is also important to correlate the pressure with the number of interstices in the restraining fabric and, as a rule, the pressure should be increased as the number of interstices increases. It has been found that, with the minimum of 750 interstices per square inch, a pressure of at least 75 pounds per square inch should be applied to the plastic/restraining layer/spacing element sandwich. Broadly speaking, the number of interstices per square inch should preferably be about ten times the pressure used in pounds per square inch up to a maximum of about 600 pounds pressure for 6,000–10,000 interstices per square inch. In normal practice, however, the pressure will fall within the range of 200–400 pounds per square inch and the number of interstices will be between 2000 and 4000 per square inch.

Subject to the above noted limitations, the restraining layer 2 used herein is chosen with a view to the size and spacing of the pile. Depending upon the thickness and nature of the thermoplastic material used, the pressure and the temperature, a greater or lesser quantity of the thermoplastic will remain behind the restraining layer and it can, therefore, be arranged that little, if any, remains on one side of the restraining element which will to some extent then form the base of the pile material. In FIGURE 6, most of the thermoplastic material has been formed into filaments but it will be noted that some of this material remains around the warp and weft yarns 7 and 8 of the fabric 2 to serve as an anchor for the pile. FIGURE 6 also shows a backing member 10 which may be included to make the product more rigid and non-skidding. This backing member 10 may comprise a sheet of the thermoplastic material, desirably but not necessarily the same as the plastic used to form the pile. This backing may be applied by positioning the same between sheet 1 and platen 6 before subjecting the resulting sandwich to heat and pressure.

FIGURES 3 and 4 show representative types of spacers 4 for use herein. Desirably, this element is made of aluminum or stainless steel or other material which will withstand the pressure involved and at the same time allow sufficient space between the thermoplastic and the platens for the information of the required length of pile. The pattern of the metal intersections of the spacing element may be varied as shown by FIGURES 3 and 4, the essential feature being that the open area of the cells 12 is sufficiently small to prevent breakthrough of the fabric or other restraining layer 2 and yet large enough to avoid interference with the plastic forced through the interstices of the layer. Thus, the open network of the spacer may be honeycomb, rectangular (as shown in FIGURE 3), square or diamond (as in FIGURE 4) without affecting the final product. The wall thickness of the spacer partitions 13 (see FIGURE 3) should normally be as thin as can be tolerated for the pressure used. If these walls are kept thin then it is found that the marks of the pattern of the spacer are not visible in the finished product as in FIGURE 2 but the pattern of the spacer divisions or partitions showning as absence of pile, may be deliberately allowed to become apparent as a means of decoration in the finished product and in that case naturally the wall thickness of the partitions will be as thick as are required to produce the desired pattern. FIGURE 4 shows a spacer 4 with comparatively thick partitions or walls 14 and FIGURE 5 shows the pattern produced by such a spacer with the absence of pile 9 along the lines 15 which correspond with the walls 14 of spacer 4.

It will be recognized that the thickness or depth of the spacer or spacing element 4 may be varied widely depending on the height of the pile desired. However, it has been found that 0.5 inch represents a practical minimum for this dimension and a greater thickness is usually preferred because this makes it possible to use both sides of the spacer simultaneously thus doubling production. In other words, another thermoplastic sheet and fabric may be positioned between the spacer 4 and platen 5 of FIGURE 1 to simultaneously form two pile products on either side of the spacer.

The invention may be carried out by using a calendered or cast film or sheet of the thermoplastic material. In the case of polyvinyl chloride, the compound is preferably at least partially gelled as it otherwise tends merely to ooze through the restraining element and collapse on the other side before filaments or piles can be formed. A stiff, viscous composition may not require gelling and in any case it is normally found that if raw compound is used a certain amount of gelling takes place while it is being brought up to temperature so that a separate gelling process may be unnecessary.

Another method is to coat a fabric by normal techniques of calendering or spreading, partially gel the compound if this step is required, and then use the laminate so formed as the starting point for pile making. The lower limit of thickness of the thermoplastic is that which will form pile through the restraining element and this has been found to be generally about .010″ while the upper limit is set by the requirements for the product. If long curled pile is required with a substantial thickness of compound remaining on the reverse side of the restraining element then naturally a thick sheet of thermoplastic will be used but this will also be governed to some extent, as already noted, by the viscosity of the compound used at the temperature and pressure of the pressing operation. A normal range of thickness of polyvinyl chloride would be from .010 to .050″ but much greater thickness can be used.

Other operating conditions, such as temperature and time will necessarily vary depending upon the material used and the nature of the product desired. Hence, it is difficult to specify particular ranges of temperature and time which will be appropriate for all situations. However, there are certain practical limits for commercial operations which should be noted. Thus, for example, the temperature to which the thermoplastic material is heated must necessarily at least equal the softening temperature of this material. For thermoplastics usually employed, e.g. polyvinyl chloride, the temperature will generally fall in the range of 135° C. to 210° C., although it will be recognized that temperatures outside this range may also be used. Similarly, the time of treatment will vary but, for practical reasons, this usually falls within the range of 2.5 to 15 minutes.

One of the advantages of the present process is that it lends itself to the preparation of a wide variety of products with different colors, designs, etc., by certain relatively simple modifications in the process illustrated in FIGURE 1. Some of these modifications for obtaining novel design effects are shown in FIGURES 7–10. Thus, FIGURE 7 shows the thermoplastic sheet 1 with cut out portions 16 into which differently colored inserts 17 may be placed as shown in FIGURE 8. The thus modified thermoplastic sheet 1, comprising the base color of the sheet and the different color of the inserts 17 is then made up into a sandwich or assembly as illustrated in FIGURE 1, with or without the mesh 3 and the further backing layer 10 as shown in FIGURE 6. After heating the assembly to the softening point of the thermoplastic material, pressure is applied to force the plastic through the fabric interstices as aforesaid. This creates a pile surface corresponding in color and pattern to the color and pattern of the sheet 1 with the inserts 17 of FIGURE 8.

FIGURE 9 shows an arrangement for obtaining the pile product of FIGURE 10 which includes the high pile surface 18 and the lower pile surface 19. This is accomplished by positioning pieces 20 of polyvinyl chloride or other plastic material on the plastic sheet 1. The assembly also includes the backing sheet 10, the fabric 2 and spacing element 4. Upon the application of heat and pressure between the platens 5 and 6, the pieces 20 are first forced through the fabric interstices into the cells 12 of the spacer followed by sheet 1. As will be appreciated, the higher pile surface 18 is formed directly above the points where the pieces 20 are positioned and the lower pile surface 19 corresponds to the areas where only the sheet 1 was forced through the fabric interstices. Obviously, the pieces 20 may be colored differently from the sheet 1 to give a vari-colored pile surface and it will thus be seen that the process lends itself to the preparation of pile products having a variety of colors or color combinations and designs.

The process as described herein is applicable primarily to operation on a flat press. However, it can be adopted to operate on a continuous basis by using two continuous belts instead of the upper and lower platens or by using a pair of rollers or a roller and belt together.

Figure 12:
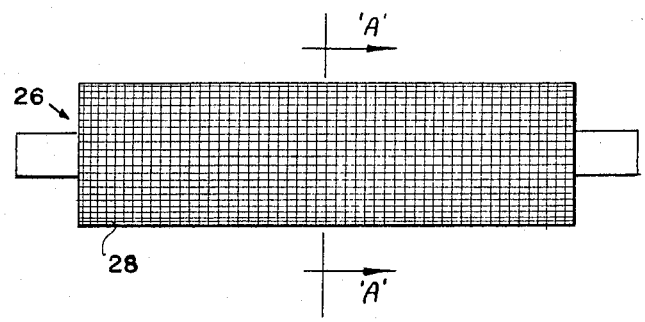
FIGURE 12 is an elevational view of one of the elements in the arrangement of FIGURE 11
Figure 13:
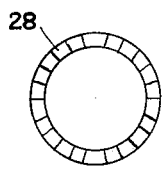
FIGURE 13 is a vertical sectional view taken on the line A—A of FIGURE 12.

A typical arrangement for carrying out the invention in continuous fashion is shown in FIGURES 11, 12 and 13. According to the arrangement shown therein, a sandwich comprising fabric 2, with interstices therein as hereinbefore described and coated with a layer of thermoplastic material 1, is passed through two heating zones 22 and 24. Zone 22 serves to heat the thermoplastic to soften same and zone 24 warms the fabric 2. The thermoplastic which is now soft and the fabric pass between two rollers 25 and 26 which exert a pressure between them. The roller 25 pressing on to the thermoplastic sheet 1 is smooth and is also heated. The other roller 26 is so made that when the thermoplastic is extruded through the interstices of the fabric 2 by passing through the nip it has space to form a pile 27 on the other side of the fabric.

FIGURES 12 and 13 show the arrangement of the face of the roll 26, the face serving as the counterpart to the spacer 4 of the batch process shown in FIGURE 1. Thus, as shown in FIGURES 12 and 13, the face of roll 26 is in the form of a large number of cells 28 like a honeycomb, but the cells may be square, rectangular, hexagonal, or of any other convenient shape or cross section. The limitations on wall thickness, cell area and depth, etc., for the face of roll 26 correspond essentially with those recited heretofore for the spacing element 4. Thus, for example, the area of the cells 28 must be such that there is sufficient space for the thermoplastic material to emerge from the fabric to form piles without undue interference from the walls of the cells. On the other hand, the area of the cells must be sufficiently small (a) to provide strength to withstand the pressure at the nip without deformation, (b) to provide support for the fabric so that it does not rupture when the thermoplastic is being pushed through, and (c) to prevent a continuous bank of the thermoplastic coating material being built up at the nip. The area of the cells and the wall thickness will moreover be governed by the fineness or coarseness of the fabric being used or by the plasticity of the thermoplastic material.

The invention is illustrated, but not limited, by the following examples wherein parts are by weight unless otherwise referred to:

EXAMPLE I

A polyvinyl chloride composition comprising 100 parts polyvinyl chloride, 72.5 parts plasticizer (e.g. dioctyl phthalate or a mixture of same with other dialkyl phthalates such as diheptyl and dinonyl phthalates) and 5 parts dry pigment was calendered into a sheet .060 inch thick. This polyvinyl chloride sheet, represented by the numeral 1 in FIGURE 1, was then laid against a woven cotton fabric 2. Ths fabric included 73 ends and 49 picks representing approximately 3577 interstices per square inch. A polyvinyl chloride backing sheet (designated by the numeral 10 in FIGURE 6) was then laid against the first polyvinyl chloride sheet 1. This backing sheet comprised 100 parts polyvinyl chloride, 60 parts dialkyl phthalate plasticizer as above and 10 parts dry pigment calendered into a sheet 0.015 inch thick. This latter sheet was somewhat harder than the polyvinyl sheet 1.

The resulting sandwich was then placed in contact with a metal spacer 4 with the fabric 2 next to the spacer and in contact therewith. In this instance, the mesh 3 shown in FIGURE 1 was omitted as unnecessary. The spacer 4 was made of aluminum and had a honeycomb structure formed by hexagonal cells having a diameter of about 1/8 inch. Thickness of the spacer walls forming the cells was .002 to .003". The spacer was approximately 1 inch thick.

The sandwich of spacer, fabric and polyvinyl sheets was positioned between the heated platens 5 and 6 as shown in FIGURE 1. The platens were heated sufficiently high to heat the polyvinyl sheet adjacent the fabric to a temperature of about 150° C. Pressure (350 pounds per square inch) was then applied on both sides of the sandwich by means of the platens, the pressure being maintained for three minutes at 150° C.

The sandwich was then allowed to cool to a safe handling temperature (e.g. 75–80° C.) and the spacer was stripped off to provide a carpet material having a highly attractive pile surface comprising curly filaments, some of which were doubled over and/or twisted together with adjacent filaments to give a highly resilient pile of uniform color corresponding to the color of sheet 1. The pile surface had excellent hand and an appearance and texture very much like wool carpeting.

In order to facilitate removal of the sandwich from the platens, it is possible to apply a releasing agent, such as polytetrafluoroethylene, to the platens. Preferably, however, a nylon or polyethylene terephthalate fabric is used as the separator. This latter feature has the advantage of providing the imprint of the fabric on the back of the product. This lends to the attractiveness of the product and also improves the antislipping characteristics thereof.

EXAMPLE II

This example illustrates a modification wherein a uniformly vari-colored pile is obtained.

The process of Example I was repeated except that the polyvinyl chloride sheet 1 was replaced by two differently colored sheets (each 0.030 inch thick), both of the same composition as sheet 1 of Example I. These two sheets were placed together and the sandwich completed as in Example I. The resulting pile surface had a uniform two color effect with the coloring of the two polyvinyl chloride sheets intermingled in the pile fibrils. The color of the sheet directly adjacent the fabric was predominant.

EXAMPLE III

The process of Example I was repeated except that the polyvinyl chloride sheet was prepared in the form of a mask with cut out portions 16 as shown in FIGURE 7. The sheet itself had a brownish color and red inserts 17 of the same composition and thickness were positioned in the cut out portions 16 as shown in FIGURE 8. When the resulting sandwich was subjected to heat and pressure as in FIGURE 1 and the spacer removed, it was found that the product had a very attractive pile surface with a red inlaid pattern effect on a brown background corresponding essentially with the color and pattern of the thermoplastic material 1 and inserts 17.

EXAMPLE IV

The process of Example I was repeated except that, in addition to the polyvinyl chloride sheet 1, further pieces 20 of the polyvinyl chloride sheet having the same composition and thickness were positioned between sheet 1 and the fabric 2 as shown in FIGURE 9. The resulting product had a pile surface of two different heights, the height of the surface directly above the pieces 20 being about twice the height of the background pile formed by extrusion of sheet 1 through the fabric interstices.

EXAMPLE V

The process of Example I was repeated except that the polyvinyl chloride sheet 1 was replaced by conventional polypropylene film of .060 inch thickness. The resulting sandwich was heated at 170° C. for 3 minutes under 350 pounds per square inch pressure. The resulting product had a sturdy pile surface of extruded polypropylene fibrils suitable for use as carpeting in aircraft or other vehicles.

It will be recognized that various modifications may be made in the invention described herein. Hence, the foregoing description is not intended to be limiting and has been given only for the purposes of illustrating the invention, the scope of which is defined in the following claims.

What is claimed is:

1. A method of preparing a thermoplastic material having a pile surface thereon which comprises placing a sheet of thermoplastic material in contact with one side of a restraining layer having a multitude of closely spaced interstices therein; thereafter placing a spacing element in contact with the other side of said restraining layer, said spacing element having openings therein each of said openings being aligned with and in communication with a plurality of the interstices in said restraining layer, said openings being of a sufficient depth to permit essentially unrestrained movement of thermoplastic material through the interstices of said restraining layer; heating the resulting sandwich to render the thermoplastic material soft and then compressing said sandwich to force the softened thermoplastic material through the interstices of the restraining layer into the openings of said spacing element to form the pile surface.

2. The method of claim 1 wherein said restraining layer is a fabric.

3. The method of claim 1 wherein said restraining layer is a fabric having from 750 to 10,000 interstices per square inch.

4. The method of claim 1 wherein said thermoplastic material is polyvinyl chloride.

5. The method of claim 1 wherein the pressure applied to said sandwich is between 75 and 600 pounds per square inch.

6. The method of claim 2 wherein the pressure is between 200–400 pounds per square inch and the number of interstices is between 2000 and 4000 per square inch.

7. The method of claim 1 wherein said spacing element comprises a metal honeycomb.

8. The method of claim 1 wherein a backing layer of thermoplastic material is applied to the opposite side of said thermoplastic sheet prior to application of said heat and pressure.

9. The method of claim 1 wherein a design is obtained in said pile by cutting out a design in said sheet.

10. The method of claim 9 wherein an insert of a differently colored thermoplastic material is placed in said cut out portion to obtain said design.

11. The method of claim 1 wherein said spacing element is at least 0.5 inch thick.

12. The method of claim 1 wherein a pile surface of varying height is obtained by positioning additional thermoplastic material between said restraining element and said sheet prior to application of said heat and pressure.

13. The method of claim 1 wherein said thermoplastic sheet is polyvinyl chloride having a thickness of from about .010 inch to .050 inch.

14. The method of claim 1 wherein said thermoplastic material is heated to a temperature between 135° C. and 210° C. for from 2.5 to 15 minutes.

References Cited by the Examiner

UNITED STATES PATENTS

| | | | |
|---|---|---|---|
| 1,576,156 | 3/1926 | Swoboda | 264—245 |
| 2,339,142 | 1/1944 | Bodle et al. | 154—49.29 |
| 2,622,052 | 12/1952 | Chandler | 156—252 |
| 2,703,909 | 3/1955 | Harwin et al. | 264—47 |
| 2,807,564 | 9/1957 | Mitchell | 264—247 |
| 2,816,853 | 12/1957 | Meyers | 156—222 |
| 3,179,550 | 4/1965 | Friedman | 156—244 |
| 3,230,134 | 1/1966 | Studer | 161—62 |

EARL M. BERGERT, *Primary Examiner.*

ALEXANDER WYMAN, *Examiner.*

R. J. ROCHE, *Assistant Examiner.*